(12) United States Patent
McRae

(10) Patent No.: US 8,736,769 B2
(45) Date of Patent: May 27, 2014

(54) ATTACHED DEVICE CONTROL ON TELEVISION EVENT

(71) Applicant: Matthew Blake McRae, Laguna Niguel, CA (US)

(72) Inventor: Matthew Blake McRae, Laguna Niguel, CA (US)

(73) Assignee: Vizio, Inc., Irvine, CA (US)

( * ) Notice: Subject to any disclaimer, the term of this patent is extended or adjusted under 35 U.S.C. 154(b) by 0 days.

(21) Appl. No.: 13/855,110

(22) Filed: Apr. 2, 2013

(65) Prior Publication Data

US 2013/0229577 A1    Sep. 5, 2013

Related U.S. Application Data

(63) Continuation of application No. 12/648,320, filed on Dec. 29, 2009, now Pat. No. 8,411,208.

(51) Int. Cl.
 *H04N 5/268*    (2006.01)
 *H04N 7/00*    (2011.01)
 *H04N 11/00*    (2006.01)

(52) U.S. Cl.
 USPC .................. 348/706; 348/552; 348/553

(58) Field of Classification Search
 USPC .......... 348/705, 706, 552–570; 715/115, 116; 725/115, 116
 See application file for complete search history.

(56) References Cited

U.S. PATENT DOCUMENTS

| | | | |
|---|---|---|---|
| 8,411,208 B2 * | 4/2013 | McRae | 348/706 |
| 2008/0228963 A1 | 9/2008 | Hironaka et al. | |
| 2009/0015723 A1 | 1/2009 | Doumuki | |
| 2009/0249420 A1 | 10/2009 | Kim | |
| 2010/0053434 A1 | 3/2010 | Lee | |
| 2010/0177912 A1 * | 7/2010 | Walsh | 381/107 |

* cited by examiner

*Primary Examiner* — Michael Lee
(74) *Attorney, Agent, or Firm* — Law Office of Scott C. Harris, Inc.

(57) ABSTRACT

A television includes at least two inputs and at least one connected device (component). Upon a system event such as changing from one input to another input, the television signals the at least one connected device to change at least one operating parameter of the device.

24 Claims, 9 Drawing Sheets

ATTACHED DEVICE CONTROL ON TELEVISION EVENT

CROSS-REFERENCE OF RELATED APPLICATION

This application is a continuation application of U.S. Ser. No. 12/648,320 filed Dec. 29, 2009, now U.S. Pat. No. 8,411,208 issued Apr. 2, 2013, the disclosure of which is herewith incorporated by reference in their entirety.

FIELD

This invention relates to the field of display devices and more particularly to a system for signaling attached devices upon certain events occurring within a television.

BACKGROUND

Television devices such as LCD or Plasma televisions are becoming more sophisticated each year. Already, most have a processor and memory and a remote control as an input device. Soon, many television devices will have Internet connections and mass storage devices (e.g., disk drives). The Internet connection and storage will be used for many purposes, including the download and storage of content (e.g., movies). The television devices have or will have input ports or other types of connections, either wired or wireless for the connection of devices such as phones, cameras, storage devices, printers, music players, etc.

In some homes and businesses, the television is simply connected to a content source such as cable or, simply an antenna, but more often, there are many other devices connected to a television. For example, in order to receive high-definition television broadcasts, the television is likely connected to a set-top box. Due to the limited speaker size and audio capabilities of most televisions, they are often connected to external amplifiers and speaker systems. Other forms of content are often connected to the television such a disk players (DVD, Blueray), Video Cassette Recorders (VCR) and music/video players.

Most of these connected devices operate independently and are unaware of each other. For example, when the television changes from an input connected to a game system to an input connected to movie content, the amplifier is not aware of the change and does not alter its settings. In such a situation, it is desirable to change certain settings in the amplifier to match the television source. For example, the user likes a certain audio response curve for games and a different audio response curve for movies or a different volume level.

There have been attempts at networking television and audio components. For example, some companies have been working to network all components through the power lines using technologies such as Home Power Line Networking Adapters (HPLNA). This movement is largely geared towards reducing the wiring between components and, since most or all components are plugged into AC power, the AC power medium is ideally suited for transferring commands and signals between components. To date, such efforts have been mostly limited to show-room demonstrations and have not succeeded commercially.

For several connection media, a two-way data path and command path is created. For example, the High Definition Multimedia Interface (HDMI) medium includes high-speed data transfer for content but also includes facilities to permit auxiliary information to be transferred between the two connected entities. Current uses of this facility are mostly to identify the connected devices to each other and describe the content being transferred. What is needed is a television system that will provide control to the connected devices (component systems) when certain events occur.

SUMMARY

The present invention includes a television with at least two inputs and at least one connected device (component). Upon a system event such as changing from one input to another input, the television signals the at least one connected device to change at least one operating parameter of the device.

For example, after a remote control instructs the television to change from one input (HDMI1) to another (HDMI2), a command is sent to a connected amplifier to change the volume to a predetermined value.

In one embodiment, a system for controlling peripherals connected to a television is disclosed including an interface between the television and at least one external device and a mechanism for storing settings related to each of one or more events, a subset of the settings being related to a first event. The system includes a mechanism for detecting the first event and a mechanism for transmitting the subset of settings related to the first event from the television to at least one of the external devices responsive to an occurrence of the first event.

In another embodiment, a method of controlling a device connected to a television is disclosed including providing an interface between the television and the device and storing a set of settings within the television, the settings related to an event within the television. Next, detecting an occurrence of the event and responsive to such, loading the set of settings related to the event and sending commands representing the set of settings from the television to the device over the interface.

In another embodiment, a television is disclosed including a display panel with a processing element interfaced to the display panel. The television has a plurality of inputs operatively coupled to the processing element with at least one device connected to the television. Each of the devices is connected to the television through one of the television inputs. There is a set of parameters stored within the television and a mechanism for changing the television from displaying content from a first input of the television inputs to a second input of the television inputs. The mechanism also includes a mechanism for transmitting a subset of the set of the parameters to at least one of the devices, the subset being associated with the second input of the television inputs.

In another embodiment, a television is disclosed including a display panel with a processing element interfaced to the display panel and a plurality of High Definition Multimedia Interface (HDMI) inputs coupled to the processing element. An audio output channel is interfaced to the processing element and an external amplifier is connected to the audio output channel. At least one source of content is provided, each of which is connected to one of the High Definition Multimedia Interface (HDMI) inputs. A set of parameters are associated with a second HDMI input of the High Definition Multimedia Interface (HDMI) inputs. Software running on the processing element is configured to change the television from displaying content from a first HDMI input of the High Definition Multimedia Interface (HDMI) inputs to the second HDMI input along with software configured to transmitting the set of the parameters associated with the second HDMI input to the external amplifier responsive to the change from displaying content from the first HDMI input to the second HDMI input.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
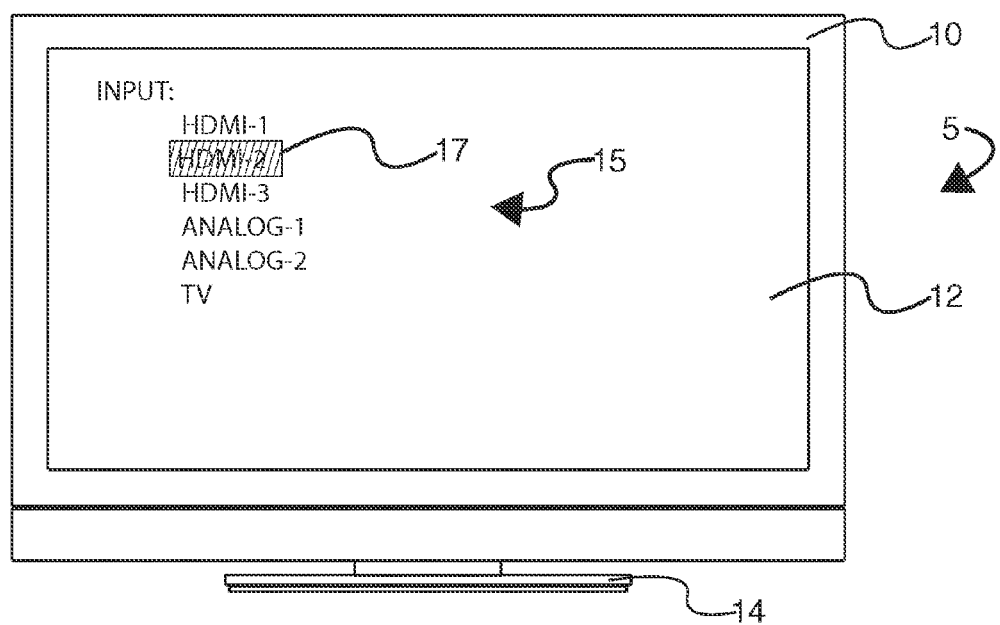
FIG. 1 illustrates a schematic view of a television with a typical input selection on-screen display.

Reference will now be made in detail to the presently preferred embodiments, examples of which are illustrated in the accompanying drawings. Throughout the following detailed description, the same reference numerals refer to the same elements in all figures.

Referring to FIG. 1, a schematic view of a television 5 with a typical input selection on-screen display will be described. A typical television 5 has a display panel 12, for example, a liquid crystal display (LCD) panel, a Plasma panel, an array of light emitting diodes (LEDS), a CRT and an organic LED (OLED), etc. Usually, the display panel 12 is bordered by a bezel 10 to cover the frame and/or electronics of the display panel 12. In some embodiments, the television 5 is supported by a base 14.

In FIG. 1, an input selection on-screen display 15 is shown being displayed on the display panel 12. The selection for HDMI-2 is shown highlighted 17, indicating that a user is about to change the input of the television 5 to the HDMI-2 input (a physical cable connection to the television 5). Typically, in such a user interface, the user maneuvers the selection indicator (e.g., highlighted text 17 in this example) to the desired selection using up/down arrow keys on a remote control 111 (see FIG. 2). Once the proper selection is indicated by the selection indicator, the user presses a different button on the remote control 111, such as "Select," at which time the television acts on the selection and changes to the selected input (e.g., HDMI-2). There are many known user interfaces for changing inputs to a television, including, but not limited to, buttons/switches on the television, dedicated buttons on the remote, dedicated cycle buttons on the remote (e.g. HDMI button cycles HDMI-1.fwdarw.HDMI-2.fwdarw.HDMI-3.fwdarw.HDMI-1 . . . ), etc.

Note that a change of input is described as an example of an event within a television system that is of interest to connected peripherals (components) and the present invention is not limited to only this type of event. Another example of an event is a change of the television state from active (something displayed on the display panel 12) to standby (e.g., off) or from standby to active. Another example of an event is a command from the remote control 111 (see FIG. 2) such as "mute." Ordinarily, the "mute" command instructs the television to reduce the output of its internal amplifier 110 (see FIG. 2), but in the present system, this is also considered an event and with the present invention, this event is capable of signaling the external amplifier 50 (see FIGS. 3 & 4) to enter a standby mode, etc.

Figure 2:
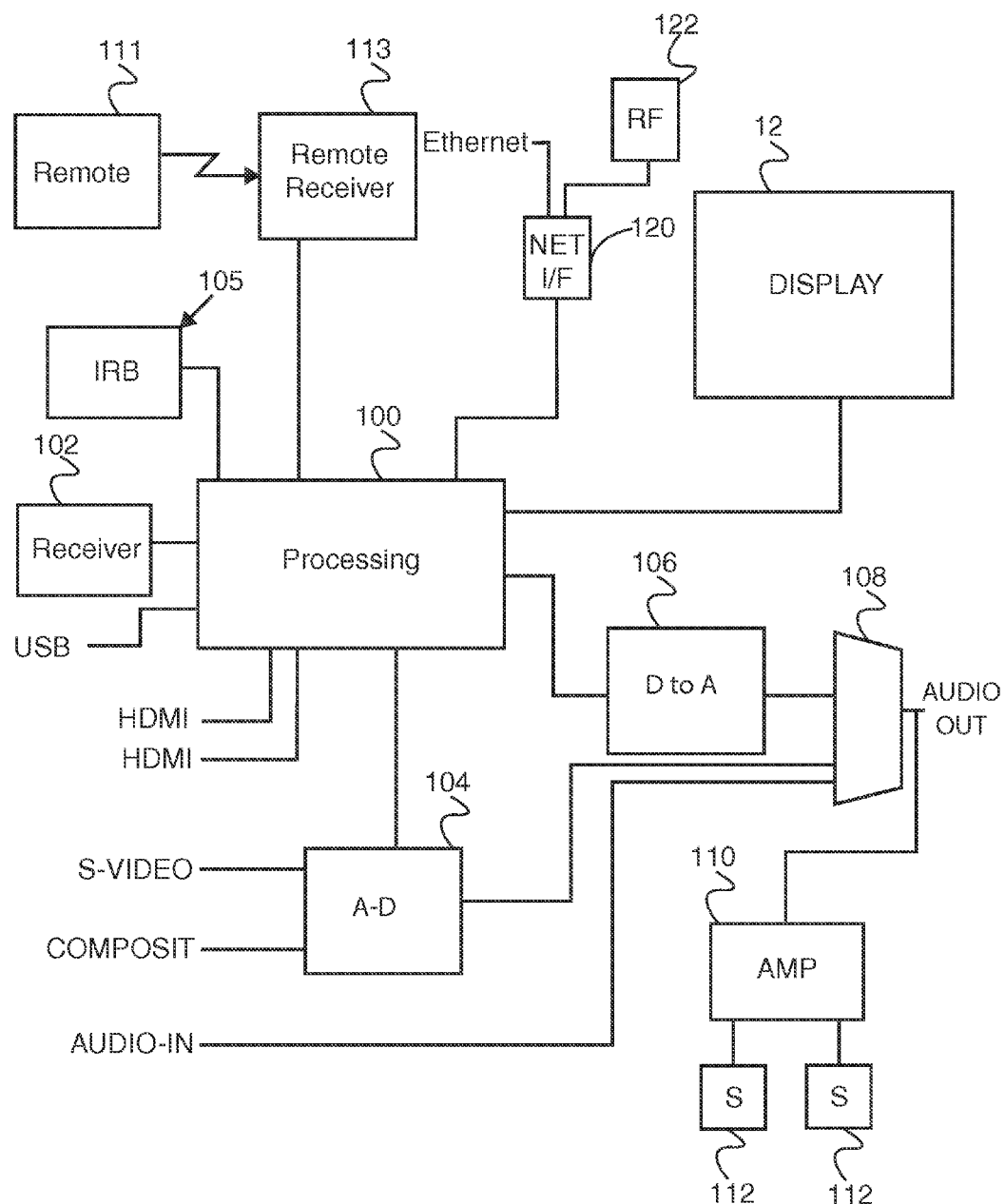
FIG. 2 illustrates a schematic view of a typical television.

Referring to FIG. 2, a schematic view of a typical television will be described. This figure is intended as a representative schematic of a typical television 5 and in practice, some elements are not present in some televisions 5 and/or additional elements are present in some televisions 5. In this example, a display panel 12 is connected to a processing element 100. The display panel 12 is representative of any known display panel including, but not limited to, LCD display panels, Plasma display panels, OLED display panels, LED display panels and cathode ray tubes (CRTs).

The processing element 100 accepts video inputs and audio inputs selectively from a variety of sources including an internal television broadcast receiver 102, High Definition Multimedia Interface (HDMI), USB ports and an analog-to-digital converter 104. The analog-to-digital converter 104 accepts analog inputs from legacy video sources such as S-Video and Composite video and converts the analog video signal into a digital video signal before passing it to the processing element. The processing element controls the display of the video on the display panel 12.

Audio emanates from, for example, the broadcast receiver 102, the legacy source (e.g., S-Video) or a discrete analog audio input (Audio-IN). If the audio source is digital, the processing element 100 routes the audio to a digital-to-analog converter 106 and then to an input of a multiplexer 108. The multiplexer 108, under control of the processing element 100, selects one of the audio sources and routes the selected audio to the audio output and an internal audio amplifier 110. The internal audio amplifier 110 amplifies the audio and delivers it to internal speakers 112.

The processing element 100 accepts commands from a remote control 111 through remote receiver 113. Although IR is often used to communicate commands from the remote control 111 to the remote receiver 113, any known wireless technology is anticipated for connecting the remote control 111 to the processing element 100 including, but not limited to, radio frequencies (e.g., Bluetooth), sound (e.g., ultrasonic) and other spectrums of light. Furthermore, it is anticipated that the wireless technology be either one way from the remote 111 to the receiver 113 or two way.

In some embodiments, an infrared blaster 105 is interfaced to the processing element 100. The infrared blaster 105 is one way for the television 5 to communicate to a connected device. For example, if the processing element 100 determines that it needs to increase the volume of an amplifier 50 (see FIG. 3) located in the same room, the processing element 100 determines the remote control command that the amplifier 50 will respond to and instructs the infrared blaster 105 to fill the room with that command so that the infrared signal will bounce off of walls, etc., and eventually reach the amplifier 50. Responsive to receiving the command, the amplifier 50 will increase the volume.

Figure 3:
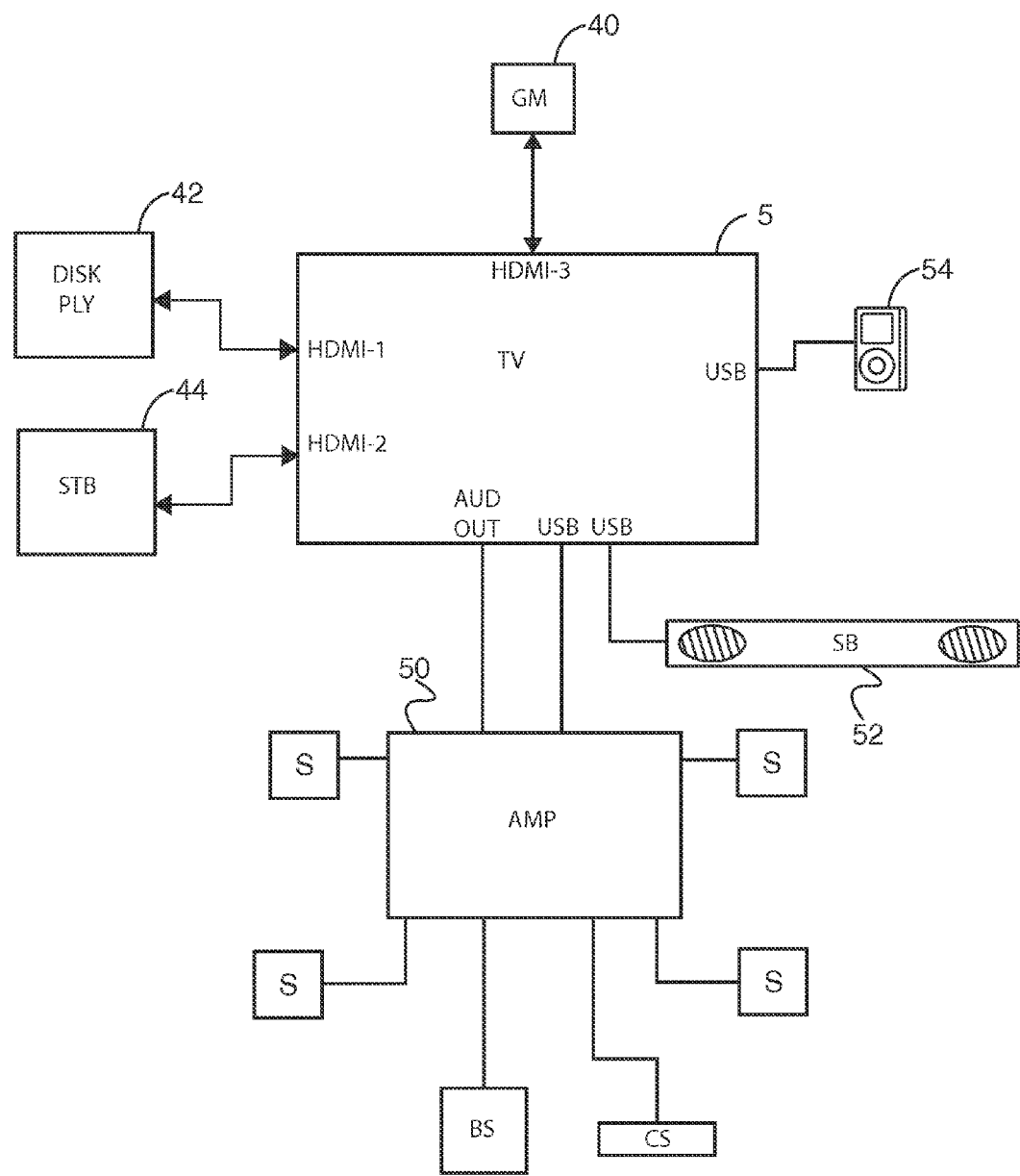
FIG. 3 illustrates a schematic view of a first exemplary interconnection of a television system.

A network interface 120 is present in some embodiments of a television 5 for connecting the processing element 100 to peripherals connected by, for example, Ethernet or wireless peripherals connected by radio frequencies such as WiFi/802.11 through an RF transceiver 122. Referring to FIG. 3, a schematic view of a first exemplary interconnection of a television system will be described. The exemplary television 5 has multiple inputs (HDMI, USB, etc). In this example, the television 5 is connected to a game console 40, to a disk player 42 (e.g., DVD or Blueray), a set top box 44 (e.g., satellite receiver), an external amplifier 50, a sound bar 52 and a music/video player 54. The television 5 is connected to a game console 40, the disk player 42 and the set top box 44 by High Definition Multimedia Interface (HDMI) cables. This interface provides for the high-speed digital transfer of content from the devices 40/42/44 to the television 5, but also provides auxiliary communication capabilities between the connected devices 40/42/44 and the processor 100 within the television 5. The HDMI includes what is called the "Consumer Electronics Control" (CEC) link. CEC uses an industry standard AV Link protocol for remote control functions, It is a one-wire, bidirectional serial bus, and was present in HDMI 1.0 specification and updated in HDMI 1.2, HDMI 1.2a, and HDMI 1.3a which added timer and audio commands. The CEC feature provides CEC-enabled devices the ability to command and control each other without user intervention.

Likewise, the sound bar 52 and music/video player 54 are connected to the television 5 through a Universal Serial Bus (USB) which provides for a digital transmission of content and/or control in both directions.

The external amplifier 50 is connected to the television through the audio output. In some examples, the audio output is simple left/right analog audio which offers little ability for the processing element 100 to communicate with the external amplifier 50, although there are modulation techniques known that enable such communications. In some examples, the audio output is digital, for example using TOSLINK (TOShiba-LINK invented by the Toshiba Company of Japan), in which case there is a known way to control the external amplifier 50 through the interface.

Figure 4:
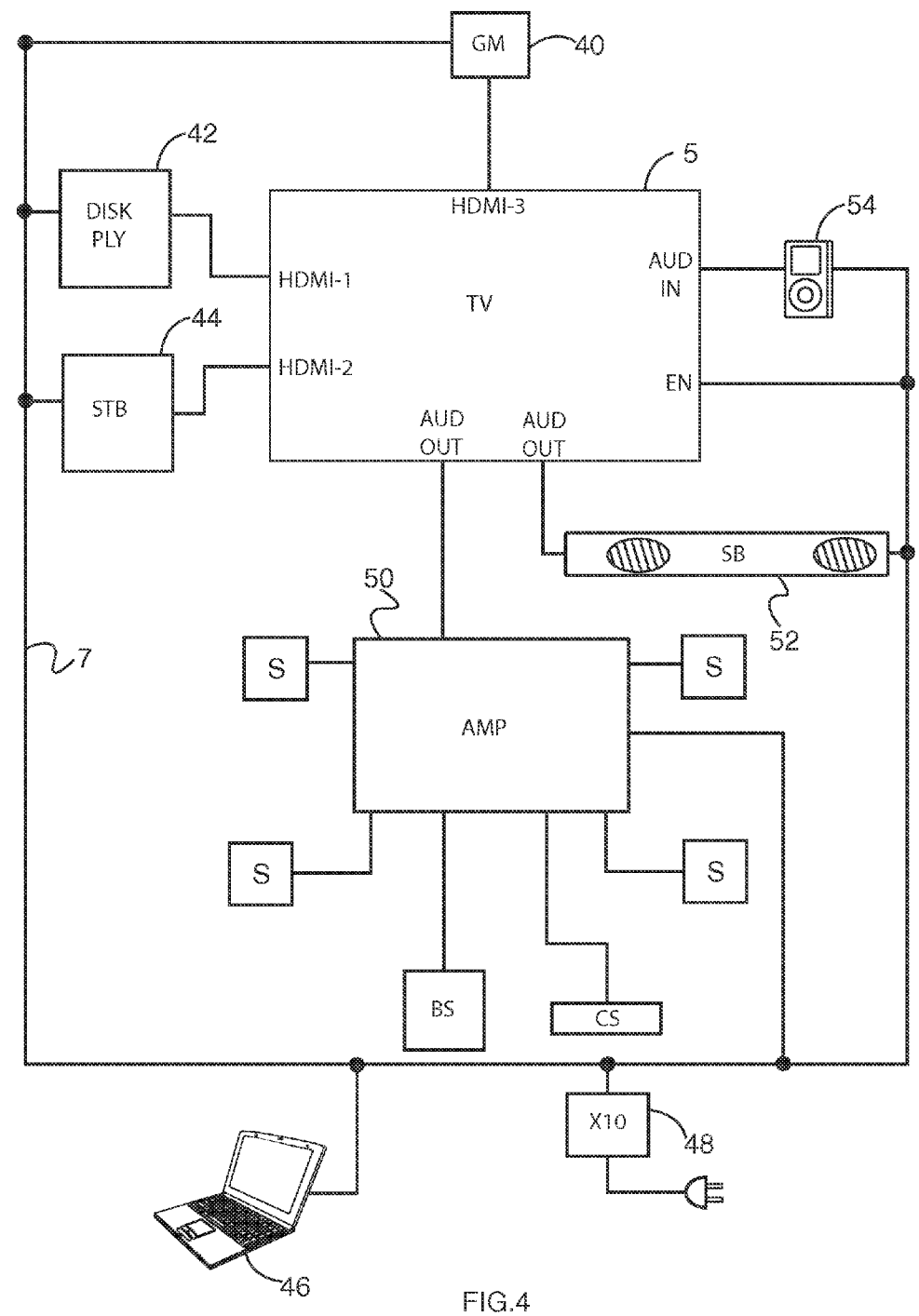
FIG. 4 illustrates a schematic view of a second exemplary interconnection of a television system.

Referring to FIG. 4, a schematic view of a second exemplary interconnection of a television system will be described. The exemplary television 5 is similar to that shown in FIG. 3 with the addition of a local area network 7. The local area network 7 provides for data and command/control of the devices 40/42/44/46/48/50/52/54 that are connected to the television 5 through the local area network 7. It is anticipated that the local area network 7 be any known wired or wireless network including, but not limited to, Ethernet, WiFi/802.11, Bluetooth, Ultra-Wide Band (UWB), power-line networking (e.g., Home Power Line Networking Adapter—HPLNA), etc.

The exemplary television 5 has multiple inputs (HDMI, USB, etc). In this example, the television 5 is connected to a game console 40, to a disk player 42 (e.g., DVD or Blueray), a set top box 44 (e.g., satellite receiver), an external amplifier 50, a sound bar 52 and a music/video player 54. The television 5 is connected to a game console 40, the disk player 42 and the set top box 44 by High Definition Multimedia Interface (HDMI) cables. The HDMI interface provides for the high-speed digital transfer of content from the devices 40/42/44 to the television 5. The network 7 provides communication capabilities such as command and control between the connected devices 40/42/44 and the processor 100 within the television 5.

Likewise, the sound bar 52 and music/video player 54 are connected to the television 5 through a Universal Serial Bus (USB). Although the USB connection provides for a digital transmission of content and/or control in both directions, it is anticipated that, in such embodiments, such devices are also controllable through the network 7.

The external amplifier 50 is connected to the television through the audio output. In some examples, the audio output is simple left/right analog audio which offers little ability for the processing element 100 to communicate with the external amplifier 50. In some examples, the audio output is digital, for example using TOSLINK (TOShiba-LINK invented by the Toshiba Company of Japan). In this example, the external amplifier 50 is connected to the network 7 for command and control signaling.

Additionally, since there is a network 7, additional devices are now capable of connecting to the television 5. For example, a computer 46 is connected as well as a home automation controller such as an X.10 interface 48 (X10 is an international and open industry standard for communication among electronic devices used for home automation) interface. Through the X.10 interface 48, the computer 46 and/or television 5 have access to various power-line devices in a household (e.g., control lighting; receive data from sensors, etc.). X.10 is but one example of a home automation control system and any such system is anticipated here within.

Figure 5:
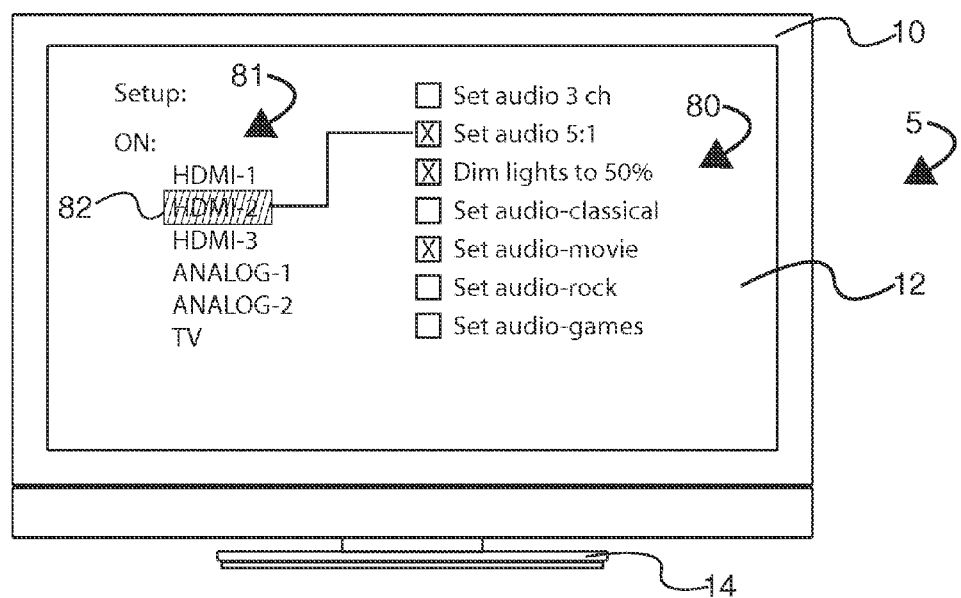
FIG. 5 illustrates a plan view of a television with an exemplary configuration on-screen display.

Referring to FIG. 5, a plan view of a television 5 with an exemplary configuration on-screen display will be described. In this exemplary user interface, a setup menu is displayed having input names 81 (e.g., HDMI-1, HDMI-2, HDMI-3, Analog-1, Analog-2, TV) and settings 40 (e.g., "set audio 3 ch"). In this example, the user has highlighted 82 the second HDMI input (HDMI-2) and the list of settings 80 pertaining to that input are displayed. In this simplified user interface, the on-screen display only presents check boxes such as "Set audio 3 ch," which, if checked, saves a value in the parameters associated with the HDMI-2 input such that, when that input is active, the television 5 commands the external amplifier 50 to configure itself for 3-channel audio mode. It is well known how to present various user interfaces, some of which provide ranges of settings using slider controls (e.g., set volume to —|—, in which the vertical bar indicates the volume setting), icons, values (e.g., 50%), etc. The present invention anticipates any known user interface for setting parameters that are associated with each input or event related to a television 5. Furthermore, it is anticipated that, for some events, a predetermined set of settings is stored within the television 5 or in the device(s). For example, in one embodiment, the television 5 has settings associated with any change of input that instructs an external amplifier 50 to change to a preset volume level (e.g., low volume).

Figure 6:
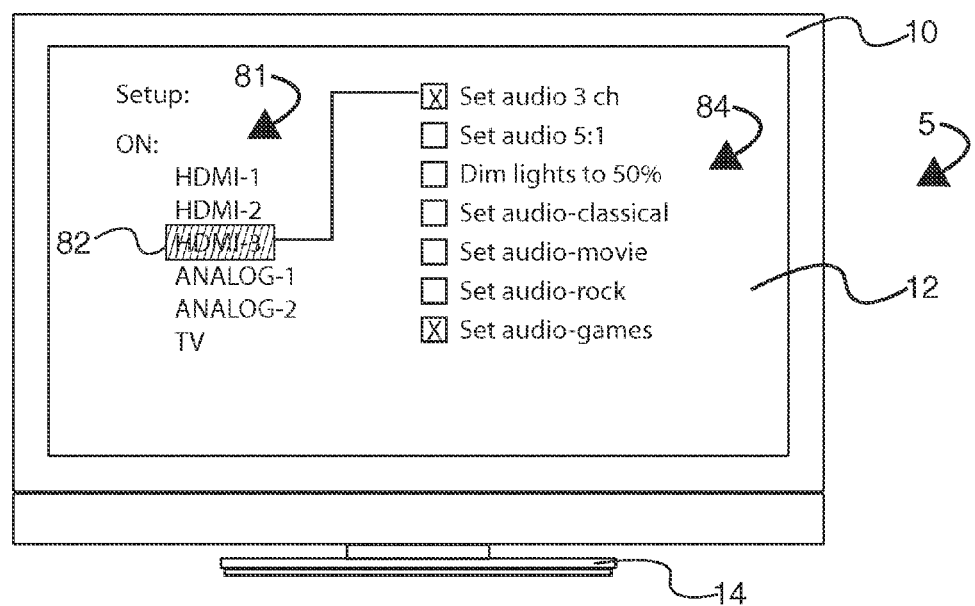
FIG. 6 illustrates a plan view of a television with a continued exemplary configuration on-screen display.

Referring to FIG. 6, a plan view of a television with a continued exemplary configuration on-screen display will be described. In this exemplary user interface, a setup menu is displayed having input names 81 (e.g., HDMI-1, HDMI-2, HDMI-3, Analog-1, Analog-2, TV) and settings 84 (e.g., "set audio 3 ch"). In this example, the user has highlighted 83 the third HDMI input (HDMI-3) and the list of settings 84 pertaining to that input are displayed.

In this example, the HDMI-3 input is connected to a game console 40 and a different set of possible settings are presented 84. In the exemplary on-screen display of FIG. 6, a different set of settings 84 is presented than those in FIG. 5 since the HDMI-3 input is connected to a different device (e.g., game console 40). It is anticipated that the on-screen display is either customized to the device or type of input (e.g., USB inputs are different than HDMI inputs) or, in some embodiments, all settings are available equally to all input selections.

As with FIG. 5, the on-screen display presents check boxes such as "Set audio 3 ch," which, if checked, saves a value in the parameters associated with the HDMI-3 input such that, when that input is active, the television 5 commands the external amplifier 50 to configure itself for 3-channel audio mode. It is well known how to present various user interfaces, some of which provide ranges of settings using slider controls (e.g., set volume to —|—, in which the vertical bar indicates the volume setting), icons, values (e.g., 50%), etc. The present invention anticipates any known user interface for setting parameters that are associated with each input or event related to a television 5.

Figure 7:
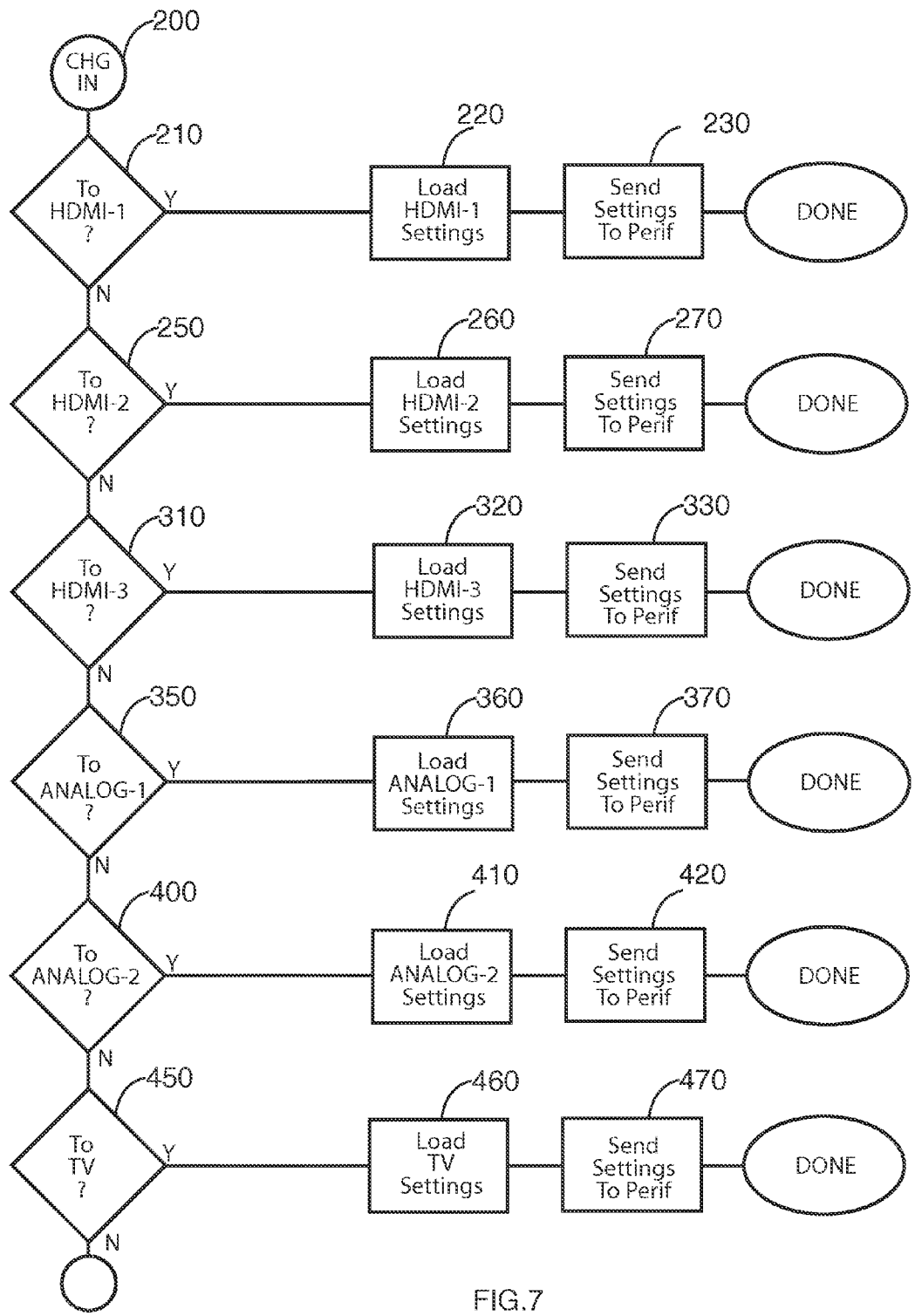
FIG. 7 illustrates a flow chart of an exemplary event.

Referring to FIG. 7, a flow chart of an exemplary event will be described. This is an exemplary program flow executed within the processing element 100 upon detection of an input change 200. If the input is changed to HDMI-1 210, the settings associated with HDMI-1 are loaded 220 and the settings are sent to the associated connected device(s) 230. For example, if one of the settings is amplifier mode and the value stored in the HDMI-1 settings for amplifier mode represents 3-channel mode, then a command is sent to the external amplifier 50 to set the external amplifier 50 to its 3-channel mode. Like wise, if one of the settings is lighting brightness and the value stored in the HDMI-1 settings for lighting brightness is 50%, then a command is sent to the X.10 controller 48 to set the lighting brightness to 50%, as known in the home automation industry.

If the input is changed to HDMI-2 250, the settings associated with HDMI-2 are loaded 260 and the settings are sent to the associated connected devices 270.

If the input is changed to HDMI-3 310, the settings associated with HDMI-3 are loaded 320 and the settings are sent to the associated connected devices 330.

If the input is changed to Analog-1 350, the settings associated with Analog-1 are loaded 360 and the settings are sent to the associated connected devices 370.

If the input is changed to Analog-2 400, the settings associated with Analog-2 are loaded 410 and the settings are sent to the associated connected devices 420.

If the input is changed to TV 450 (e.g., receive broadcast television through the internal receiver 102), the settings associated with TV are loaded 460 and the settings are sent to the associated connected devices 470.

Figure 8:
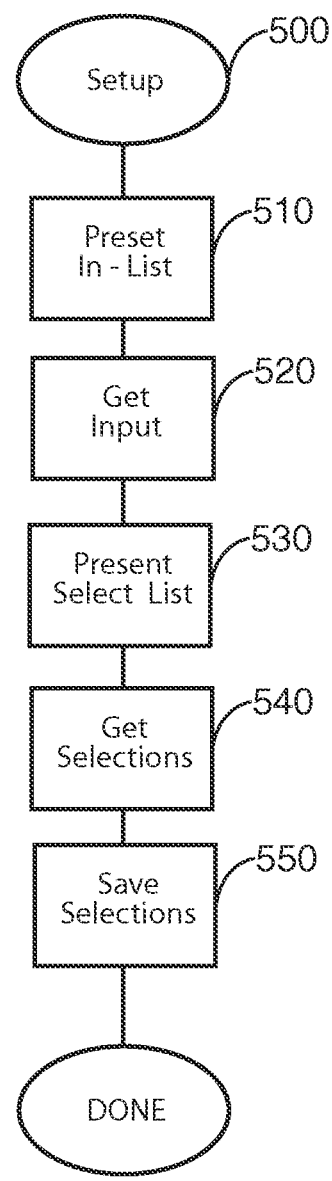
FIG. 8 illustrates a flow chart of an exemplary configuration program.

Referring to FIG. 8, a flow chart of an exemplary configuration program will be described. This is an exemplary program flow executed within the processing element 100 when a user, typically using a remote control, invokes a setup screen to change parameters associated with an external device. When the setup is entered 500, a list of possible inputs is displayed 510. The user selects one of the inputs 520 and, responsive to this, the user is presented with an array of settings 530 associated with that input. Any presentation of the possible inputs and array of settings for each possible input is anticipated. Examples are shown with FIGS. 5 and 6. It is also anticipated that the setup 500 is run externally on a richer user interface such as provided on a computer 46 and the parameters are then copied to the processing element of the television 5.

The user enters their selections 540 and the selections are saved 550, associated with the selected input.

Figure 9:
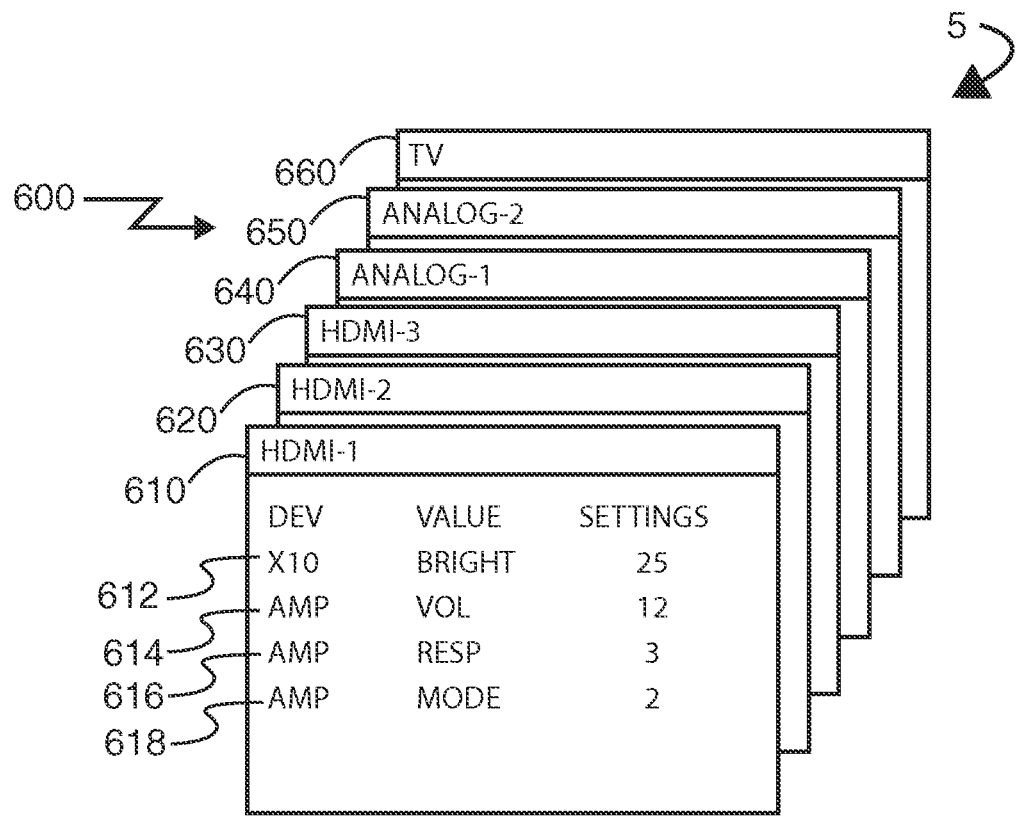
FIG. 9 illustrates an exemplary data structure.

FIG. 9 illustrates an exemplary data structure. There are many ways known to store parameters associated with inputs and events and all are included here within. In this exemplary data structure 600 there are objects 610/610/620/630/640/650/660 (e.g., a file, a record, etc.) for each possible input. In some embodiments, all objects have equivalent fields while in other embodiments, there are some objects having different fields than other objects. In the view shown in FIG. 9, the data structure for HDMI-1 610 is visible. In this embodiment, the object stores tuples of device, value and setting. For example, the first tuple 612 relates to the X.10 interface 48 and the value is brightness and the setting is 25, e.g., set the room brightness to 25%. This tuple is interpreted by the processing element 100, resulting in the processing element 100 sending a command to the X.10 interface 48 to set the room brightness to 25%.

The next three tuples are amplifier settings for volume 614, response curve 616 and speaker configuration (sound mode) 618. In this example, volume 614 has a setting of 12 (e.g., 12% of maximum volume), the response curve 616 has a value of 3 (e.g., Rock setting) and the sound mode 618 has a value of 2 (e.g., 2-channel setting). These tuples are interpreted by the processing element 100, resulting in the processing element 100 sending one or more commands to the external amplifier 50 to set the volume to 12%, the response curve to rock and roll and the mode to 2-channel.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A television system comprising:
a television, having a display, and a user interface, and having multiple ports, each connectable to devices which communicate content with the television;
a processor in said television, receiving commands, and controlling changing which of the multiple ports is active;
a memory, storing settings that are associated with said ports, and said settings are used to control at least one external device,
including a first set of settings for a first external device that are used when a first port is connected to said television, and a second set of settings for said first external device that is used when a second port is connected to said television, where said first set of settings is different settings than said second set of settings, but is for the same external device, and where said settings include at least a volume for the external device when a specific port is connected, and a number of channels of audio output for the external device when the specific port is connected; and
said television detecting which of the ports is connected to the television, and sending information that is based on said settings for the connected port to control said at least one external device.

2. The system of claim 1, wherein the interface between the television and the at least one external device is via infrared.

3. The system of claim 1, wherein said ports are different inputs to the television, and each of said ports defines multiple different controls for the external devices including a different volume for the external devices and a different number of channels for the external devices.

4. The television as in claim 1, wherein said set of set of settings includes multiple parameters for each external device.

5. The system of claim 1, wherein the interface between the television and the at least external device is integrated into a connection between the television and the at least one external device.

6. The system of claim 5, wherein the at least one external device is controlled via a Consumer Electronics Control (CEC) link of a High Definition Multimedia Interface (HDMI) interface.

7. The television as in claim 4, wherein each of said multiple parameters includes a record including a device name, a parameter name for the device, and a setting for the parameter and where the setting for the parameters is set to different values for different devices.

8. The system of claim 7, wherein said external devices includes both an audio device and a lighting device, and the record includes all of a device indicator, a setting indicator for the device, and a value for the setting.

9. A method of operating a television, comprising:
displaying content on a television from a source;
selecting which of multiple sources provide the content to the television via multiple ports;
storing settings that are associated with said ports, where said settings are used to control at least one external device, that is external to the television,
including a first set of settings for a first external device that are used when a first port is connected to said television, and a second set of settings for said first external device that is used when a second port is connected to said television, where said first set of settings is different settings than said second set of settings, but is for the same external device, and where said settings include at least a volume for the external device when a specific port is connected, and a number of channels of audio output for the external device when the specific port is connected; and
detecting which of the ports is connected to the television, and sending information that is based on said settings for the connected port to control said at least one external device.

10. The method of claim 9, wherein said ports are different inputs to the television, and each of said ports defines multiple different controls for each of the external devices.

11. The method of claim 9, wherein said sending information comprises controlling settings on both an audio device and a lighting device for at least one port.

12. The method of claim 9, wherein said sending information comprises controlling settings over a connection between the television and the at least one external device.

13. The method of claim 12, wherein the at least one external device is controlled via a Consumer Electronics Control (CEC) link of a High Definition Multimedia Interface (HDMI) interface.

14. The method as in claim 9, wherein said set of set of settings includes multiple parameters for each external device.

15. The television as in claim 14, wherein each of said multiple parameters includes a record including a device name, a parameter name for the device, and a setting for the parameter and where the setting for the parameters is set to different values for different devices.

16. A television comprising:
a display panel;
a processing element interfaced to the display panel;
a plurality of television inputs operatively coupled to the processing element;
a connection at least one external device;
said processing element receiving commands, and changing which of the television inputs is connected to the television and producing a video output for the television;
a storage unit storing a set of parameters, including a first set of settings for a first external device that are used when a first television input is connected to said television, and a second set of settings for said first external device that is used when a second television is connected to said television, where said first set of settings is different settings than said second set of settings, but is for the same external device, and where said settings include at least a volume for the external device when a specific port is connected, and a number of channels of audio output for the external device when the specific port is connected;
said processing element sending information that is based on which of said television inputs is connected to the television, to control said first external device based on a set of settings depending on which television input is connected to said television.

17. The television as in claim 16, wherein said set of parameters includes multiple parameters for each external device including a different volume for the external devices and a different number of channels for the external devices.

18. The television as in claim 17, wherein each of said multiple parameters includes a record including a device name, a parameter name for the device, and a setting for the parameter and where the setting for the parameters is set to different values for different devices.

19. The television of claim 18, wherein said external devices includes both an audio device and a lighting device.

20. The television of claim 17, wherein the interface between the television and the at least external device is integrated into a connection between the television and the at least one external device.

21. The system of claim 20, wherein the at least one external device is controlled via a Consumer Electronics Control (CEC) link of a High Definition Multimedia Interface (HDMI) interface.

22. A television comprising:
a display panel;
a processing element interfaced to the display panel;
a plurality of television inputs operatively coupled to the processing element;
a connection at least a first external device that controls sound output and a second external device that controls light output;
said processing element receiving commands, and changing which of the television inputs is connected to the television and producing a video output for the television;
a storage unit storing a set of parameters, including a first set of settings for the first external device that are used when a first television input is connected to said television, and a second set of settings for said first external device that is used when a second television input is connected to said television, where said first set of settings is different sound settings than said second set of settings, but is for the same external device, and including a third set of settings for the second external device that are used when the first television input is connected to said television, and a fourth set of settings for said first external device that is used when the second television input is connected to said television, where said third set of settings is different light settings than said fourth set of settings, but is for the same external device;
said processing element sending information that is based on which of said television inputs is connected to the television, to control said first external device based on a set of settings depending on which video port is connected to said television.

23. The television as in claim 22, wherein said set of parameters includes multiple parameters for each external device, and where the first set of settings includes both the volume setting for the first external device, and a number of channels of audio output which will be used by the first external device.

24. The television as in claim 23, wherein each of said multiple parameters includes a record including a device name, a parameter name for the device, and a setting for the parameter and where the setting for the parameters is set to different values for different devices.

* * * * *